US012434519B2

(12) United States Patent
Vingnesengen et al.

(10) Patent No.: US 12,434,519 B2
(45) Date of Patent: Oct. 7, 2025

(54) CHASSIS COMPONENT AND METHOD FOR PRODUCING A CHASSIS COMPONENT

(71) Applicant: BENTELER AUTOMOBILTECHNIK GMBH, Paderborn (DE)

(72) Inventors: Lars Erik Vingnesengen, Gjovik (NO); Tom Holmgren, Gjovik (NO)

(73) Assignee: BENTELER AUTOMOBILTECHNIK GMBH, Paderborn (DE)

(*) Notice: Subject to any disclaimer, the term of this patent is extended or adjusted under 35 U.S.C. 154(b) by 28 days.

(21) Appl. No.: 18/523,336

(22) Filed: Nov. 29, 2023

(65) Prior Publication Data

US 2024/0174038 A1 May 30, 2024

(30) Foreign Application Priority Data

Nov. 30, 2022 (EP) .................................. 22210563

(51) Int. Cl.
*B60G 7/00* (2006.01)

(52) U.S. Cl.
CPC ........ *B60G 7/001* (2013.01); *B60G 2206/121* (2013.01); *B60G 2206/8105* (2013.01); *B60G 2206/83* (2013.01)

(58) Field of Classification Search
CPC ............. B60G 7/001; B60G 2206/121; B60G 2206/8105; B60G 2206/83; B60G 7/02; B60G 2200/46; B60G 2200/4622; B60G 2204/143; B60G 2204/44; B60G 2204/61; B60G 2206/16; B60G 2206/7102;
(Continued)

(56) References Cited

U.S. PATENT DOCUMENTS 6,409,189 B1 * 6/2002 Orimoto ................ B62D 17/00
  280/86.754
10,017,020 B2 * 7/2018 Andreasen .............. F16B 39/28
(Continued)

FOREIGN PATENT DOCUMENTS

DE        19758003 A1    8/1998
DE    102016121131 A1    5/2018
(Continued)

OTHER PUBLICATIONS

Extended European Search Report for European Application No. 22 21 0563 mailed May 12, 2023; 16pp.

*Primary Examiner* — Drew J Brown
(74) *Attorney, Agent, or Firm* — HAUPTMAN HAM, LLP

(57) ABSTRACT

The present disclosure relates to a chassis component having a base body, wherein the base body has an opening for passing through a fastening means and two guide elements for guiding an eccentric element are arranged on opposite sides of the opening, wherein the guide elements are formed in one piece and using the same material of the base body of the chassis component by mechanical processing and each have a back side and a contact side facing the opening, wherein the contact side is formed orthogonally to the base body. According to the present disclosure, an outer transition region with a radius is formed between the respective contact sides and the base body. The present disclosure further relates to a method for producing a chassis component.

5 Claims, 5 Drawing Sheets

(58) Field of Classification Search
CPC ............ B60G 2206/8102; B60G 11/00; B60G 2204/10; B21D 17/02; B21D 22/04; B21D 53/88; B21D 22/02
See application file for complete search history.

(56) References Cited

U.S. PATENT DOCUMENTS

| | | | |
|---|---|---|---|
| 10,864,790 B2* | 12/2020 | Behn ........................ | B60G 7/02 |
| 11,260,715 B2* | 3/2022 | Ruesing ................... | B60G 7/02 |
| 11,338,635 B2 | 5/2022 | Abram et al. | |
| 2011/0068524 A1* | 3/2011 | McCarthy .............. | B60G 11/12 |
| | | | 267/265 |
| 2013/0193660 A1* | 8/2013 | Ramsey ................. | B62D 21/11 |
| | | | 280/124.1 |
| 2015/0231940 A1 | 8/2015 | Klaassen et al. | |
| 2016/0121676 A1* | 5/2016 | Drabon ................... | B60G 7/02 |
| | | | 280/124.125 |
| 2018/0126814 A1 | 5/2018 | Fluerenbrock et al. | |
| 2019/0176555 A1* | 6/2019 | Behn ........................ | B60G 7/02 |
| 2024/0140157 A1* | 5/2024 | Meyer .................... | B60G 11/14 |

FOREIGN PATENT DOCUMENTS

| | | |
|---|---|---|
| DE | 102020007875 A1 | 3/2021 |
| EP | 2783947 A1 | 10/2014 |
| EP | 2910454 A1 | 8/2015 |
| JP | H06247336 A | 9/1994 |
| KR | 20160140179 A | 12/2016 |

* cited by examiner

CHASSIS COMPONENT AND METHOD FOR PRODUCING A CHASSIS COMPONENT

RELATED APPLICATIONS

The present application claims priority of European Application Number 22210563.7 filed Nov. 30, 2022, the disclosure of which is hereby incorporated by reference herein in its entirety.

FIELD

The present disclosure relates to a chassis component and to a method for producing a chassis component.

BACKGROUND

Chassis components, which guide and stabilize the wheel suspension connected to a wheel of the motor vehicle, are mechanically connected to the wheel suspension and the chassis of the motor vehicle. Such a chassis component is a spring link. In order to be able to precisely adjust and align corresponding chassis components during assembly and, for example, to adjust the toe or camber of the wheels of the motor vehicle, the mechanical connection is able to be provided via an eccentric mechanism.

Chassis components with a corresponding eccentric mechanism have an opening and two guide elements arranged on opposite sides of the opening for guiding an eccentric element. The eccentric element is formed from an eccentric disk or eccentric screw, which have a collar which is arranged eccentrically with respect to the axis of rotation of the eccentric element. The collar of the eccentric element is in contact with the guide elements. The opening in the chassis component is able to be designed as an elongated hole, so that the chassis component, e.g., the spring link, is moved further towards the outside of the vehicle or towards the inside of the vehicle by the guide elements when the eccentric element rotates.

Corresponding eccentric arrangements are described in U.S. Pat. No. 11,338,635 B2, which describes a multi-leg link for a wheel suspension in a vehicle, wherein an eccentric disk of a corresponding eccentric mechanism is designed to rest on guide elements in order to guide the link with respect to an axle carrier and/or wheel carrier when the eccentric disk rotates and thus determine the steering camber and/or toe. The guide elements are formed in one piece with the material of a link arm and have a rectangular shape with rounded ends. Due to the shape of the guide elements, high pressure is required for the forming process. Due to the high pressure, the forming process leaves pinch joints or other damage on the component, which reduces the service life of the chassis component.

U.S. Pat. No. 11,260,715 B2 also describes a corresponding eccentric mechanism with guide elements. The guide elements in said patent are slotted using cutting technology, which is able to have a negative effect on the service life of the component and increases the risk of cracks forming within the guide elements.

SUMMARY

The object of the present disclosure is to provide a chassis component with guide elements which achieves a longer service life and is inexpensive to produce.

A further object of the present disclosure is to provide a method for producing a corresponding chassis component.

The aforementioned object is achieved according to the disclosure with a chassis component.

The method part of the object is further achieved with a method for producing a chassis component. The chassis component according to the disclosure, which is able to be a wishbone or a spring link in some embodiments, has a base body, wherein the base body is a link arm of the spring link. The base body also has an opening for passing through a fastening means. Two guide elements for guiding an eccentric element are arranged on the opposite sides of the opening. The guide elements are formed in one piece and using the same material of the base body of the chassis component by mechanical processing. This configuration makes provides for easy and cost-effective production of the guide elements, since no separate component is required and the guide elements are formed in a simple manner by the material of the chassis component. Due to the one-piece design and material unity, additional fastening of the guide elements is not necessary. This is able to prevent them from slipping or coming loose in the finished chassis component, as would be possible if a separate component was used. This significantly increases the service life of the component and permanently ensures the adjustment for toe and/or camber.

The guide elements each have a back side and a contact side facing the opening. The contact side is aligned orthogonally to the base body. The guide elements come into contact with the eccentric element via the contact sides and thus ensure a displacement of the chassis component due to a corresponding rotation of the eccentric element. When the eccentric element rotates, a force is transmitted to the guide elements via the contact sides.

In at least one embodiment of the disclosure, an outer transition region with a radius is formed between the respective contact sides and the base body. Due to the force transmitted by the eccentric elements, the guide elements are subjected to a high load. This load often results in crack formation, which is able to occur at the transition point between the contact side and the base body. The service life of the chassis component is therefore reduced. The transition region according to the disclosure between the contact sides and the base body initially increases the material thickness in this critical region. Surprisingly, the formation of the transition region with a radius has also been shown according to the disclosure, which connects the contact sides to the base body, significantly reduces the risk of crack formation. This increases the service life of the chassis component. The thus formed radius also ensures a secure fit between the contact side and the eccentric element. In addition, the shape of the transition region according to the disclosure is suitable for cost-effective production of the chassis component by shifting the material of the chassis component from the base body.

The radius of the outer transition region according to the disclosure is able to be between 0.2 mm and 2 mm, and 0.5 mm and 1.5 mm. Appropriate dimensioning has proven to be advantageous for the stability of the guide elements.

The back sides of the guide elements taper in the opposite direction to the contact sides and merge into the base body. This has several advantages. Due to the tapering of the back sides and the transition into the base body, the guide elements are able to be designed to save a lot of space. The guide elements are able to occupy a total area on the base body of less than 20 mm$^2$, between 4 and 18 mm$^2$, between 6 and 15 mm$^2$. Surprisingly, this shape of the guide elements counteracts material fatigue despite the small area has been shown. Due to the shape of the guide elements, the grain flow of the material is not interrupted, which is able to lead to a low tendency for crack formation. Due to the material uniformity in the tapering of the back sides with a corresponding transition into the base body, the guide elements are also extremely robust. The force transmitted by the eccentric element is able to be transferred very well to the base body due to the shape of the guide elements. The shape of the guide elements is also suitable for cost-effective production of the chassis component by shifting the material of the chassis component from the base body.

The contact sides have a plano-convex shape. The plano-convex shape of the contact sides, which are aligned orthogonally to the base body, forms an optimal contact for the eccentric element and prevents the eccentric element from slipping.

Alternatively, the side of the contact side facing away from the base body is able to have an at least partially flattened region which runs parallel to the base body. In this way, the height of the contact sides and thus the height of the guide elements is able to be made as low as possible without reducing the contact surface for the eccentric element. The flattened region is able to be completely flat, or less curved, so that an overall flatter contact surface results than with a plano-convex design of the contact side.

The base body has an indentation below the guide elements. The indentation has a front side and a top side, the front side being arranged parallel to the contact side. A corresponding indentation is formed by the manufacturing process of the guide elements, since the material of the base body is displaced to the outside, for example by a punch. In the context of the disclosure, a parallel alignment of the front side with the contact side leads to increased stability between the guide elements and the base body, which has an advantageous effect on the energy flow and the service life of the chassis component.

An inner transition region with a radius is arranged between the front and the top side. The transition region increases the stability of the guide elements and reduces the risk of cracks at the contact point between the front and the top.

The base body has an underside in the region of the opening. A lower transition region with a radius can be formed between the front and the bottom. The chassis component can be designed in such a way that the inner transition region merges directly into the lower transition region. In this case, no separate front side is formed between the transition regions.

An orthogonal distance is formed between the parallel front side and contact side, which corresponds to between 10% and 50% of the material thickness of the base body. This ensures sufficient material thickness between the contact side and the front side, so that there is sufficient stability of the guide elements. At the same time, the distance according to the disclosure between the front side and the contact side provides an optimal shape or size of the guide elements. The distance corresponds to between 20% and 40% of the material thickness of the base body and between 25% and 35% of the material thickness of the base body.

A distance between the outer transition region and the inner transition region is provided in a central vertical cross section of the guide elements, which corresponds to between 30% and 80% of the material thickness of the base body. This is the shortest distance between the inner transition region and the outer transition region. In some embodiments of the disclosure, this distance provides a high level of robustness and service life of the guide elements. A distance according to the disclosure leads to a stable material structure with a low risk of cracks. The grain flow of the material is not interrupted by the distance according to the disclosure between the transition regions. The distance is between 40% and 60% of the material thickness of the base body and between 45% and 55% of the material thickness of the base body. This distance is additionally largely determined by the presence of the radius of the outer transition region according to the disclosure and the radius of the inner transition region.

In at least one embodiment of the present disclosure, the chassis component is made of a light metal material, for example an aluminum alloy. This reduces the weight of the chassis component, which has an advantageous effect on the driving characteristics and fuel consumption of the motor vehicle.

The chassis component is an extruded profile. Chassis components with complex and irregular shapes are also able to be manufactured.

The guide elements are cold-formed. This enables short processing times, good surface quality, tight dimensional tolerances, optimal material utilization and long-term consolidation of the material. The grain flow of the material is also not interrupted. Cold forming maintains the continuous structure of the material without any tendency for crack formation. Due to the displacement or shift of material instead of an incision and the associated essentially uninterrupted grain flow, a cut-related breakage in the contact side is avoided and the risk of cracks forming and growing when producing the chassis component, especially during its service life, is reduced.

In at least one embodiment of the present disclosure, the contact sides have a height that is less than or equal to the material thickness of the base body. Since the guide elements are formed in one piece and with the same material of the base body of the chassis component, this ensures that the material thickness of the guide elements is sufficient for the load caused by the eccentric element.

The opening in the base body of the chassis component is an elongated hole. A corresponding elongated hole allows the chassis component to be displaced relative to the eccentric element.

The method according to the disclosure for producing a chassis component comprises the following steps:
  providing a chassis component precursor which has a base body,
  inserting the base body into a forming tool for forming guide elements, wherein the forming tool has a punch, a lower die and a fixing element, wherein the lower die has mold recesses corresponding to the guide elements to be formed,
  forming the guide elements by linearly advancing the punch, wherein the punch is aligned at an angle $\alpha$ between 30° and 60° relative to the base body in order to obtain the chassis component.

The chassis component precursor is a wishbone, or a spring link.

In at least one embodiment of the present disclosure, the chassis component has two opposing spring arms, each with a base body, wherein both base bodies being simultaneously provided with corresponding guide elements during the forming process.

In at least one embodiment of the present disclosure, the chassis component precursor is made of an aluminum alloy and is an extruded profile.

In at least one embodiment of the present disclosure, the base body already has an opening for passing through a fastening means, so that the guide elements are able to be formed on opposite sides of the opening for guiding an eccentric element.

Alternatively, an opening for passing through a fastening means is able to be formed in the base body simultaneously with the guide elements, wherein the guide elements are also in this case arranged on opposite sides of the opening. In this embodiment variant, two forming steps are able to be carried out in one, which speeds up the manufacturing process.

The guide elements are formed using a cold forming process. This enables short processing times, good surface quality, tight dimensional tolerances, optimal material utilization and long-term consolidation of the material. The grain flow of the material is also not interrupted.

Initially the base body is inserted into the forming tool so that the base body rests on the lower die. The base body is fixed on the lower die by the fixing element. In a next step, the guide elements are formed by linearly advancing the punch. To do this, the punch presses the material of the base body into the corresponding mold recesses. Due to the oblique alignment of the punch to the base body according to the disclosure, only a small amount of pressure is required compared to conventional manufacturing processes. The force is between 5 t and 20 t, or between 7.5 t and 13 t. The lower pressure is able to save energy costs. In addition, both the forming tool and the chassis component precursor are subjected to less stress. In addition, due to the low pressure, the material of the base body is not damaged by the forming tool, so that no weak points remain in the material. The oblique orientation of the punch also leads to an advantageous grain flow within the material, which enables the guide elements to be highly robust. There is only an extremely low risk of cracks at the transition between the base body and the guide element. Furthermore, no cutting of the material is required, which also improves the robustness and strength of the guide elements according to the disclosure.

The punch head is designed in such a way that, as a result of the forming process, the contact sides of the guide elements have a plano-convex shape and the back sides taper in the opposite direction to the contact sides and merge into the base body. The mold recesses of the lower die are also designed accordingly.

In at least one embodiment of the present disclosure, the punch head is designed in such a way that by the forming process an inner transition region with a radius is formed between the front side and the top side. The mold recesses of the lower die are designed in such a way that by the forming process an outer transition region with a radius is formed between the contact side and the base body.

The surfaces of the guide elements are able to be polished after the forming process. This additionally increases the service life of the chassis component.

BRIEF DESCRIPTION OF THE DRAWINGS

The invention disclosure is described in more detail hereinafter on the basis of exemplary embodiments illustrated in the drawings. In the figures.

DETAILED DESCRIPTION

In the figures, the same reference numbers are used for same or similar components, even if a repeated description is omitted for reasons of simplicity.

Figure 1A:
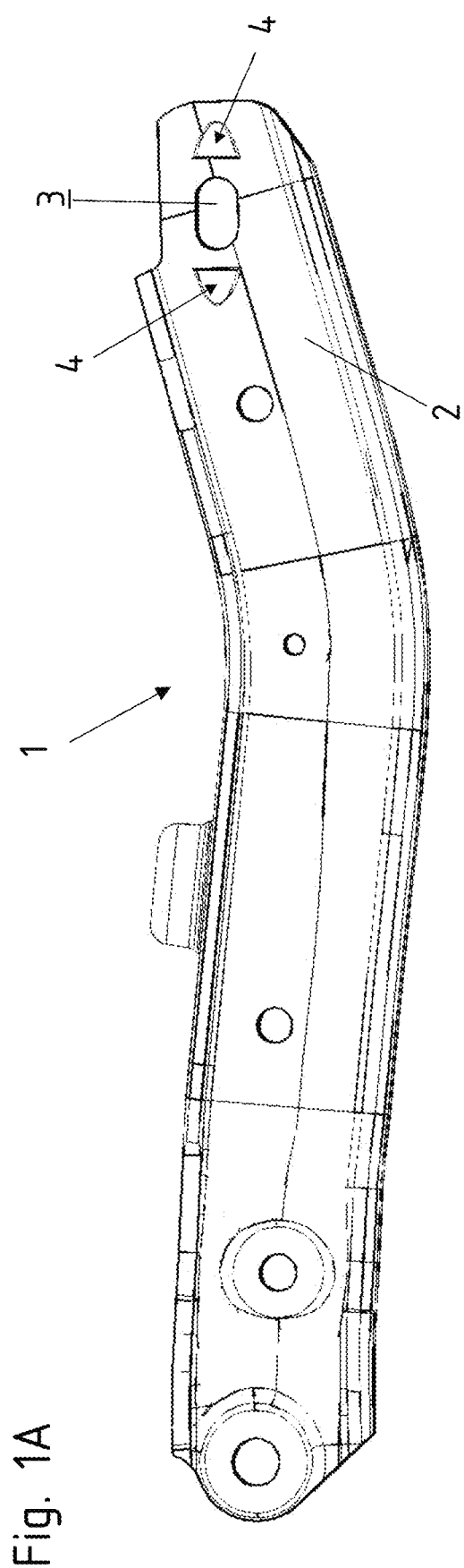
FIG. 1A shows a chassis component in a side view according to at an embodiment of the disclosure.
Figure 1B:
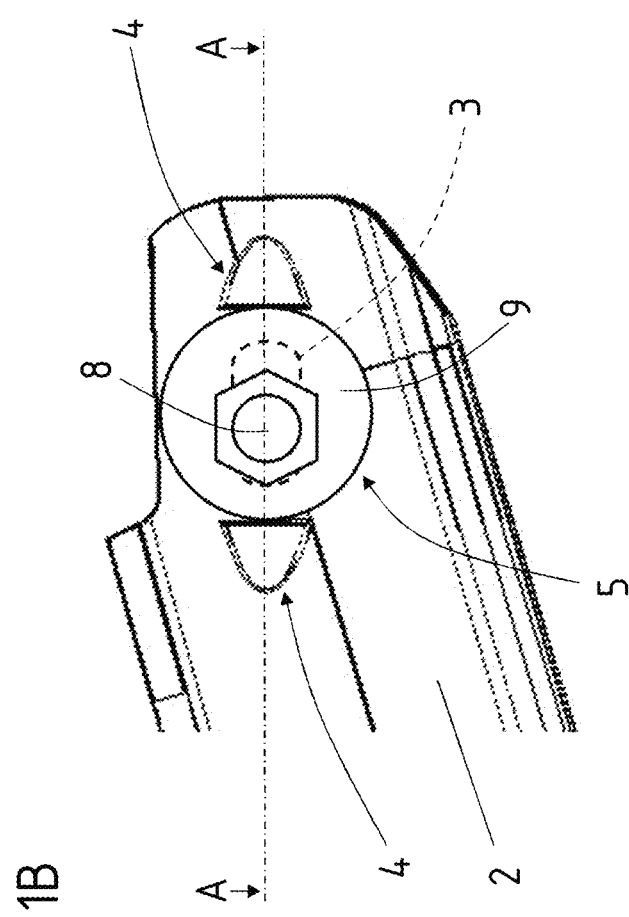
FIG. 1B shows a detailed view of a chassis component according to at an embodiment of the disclosure.
Figure 2:
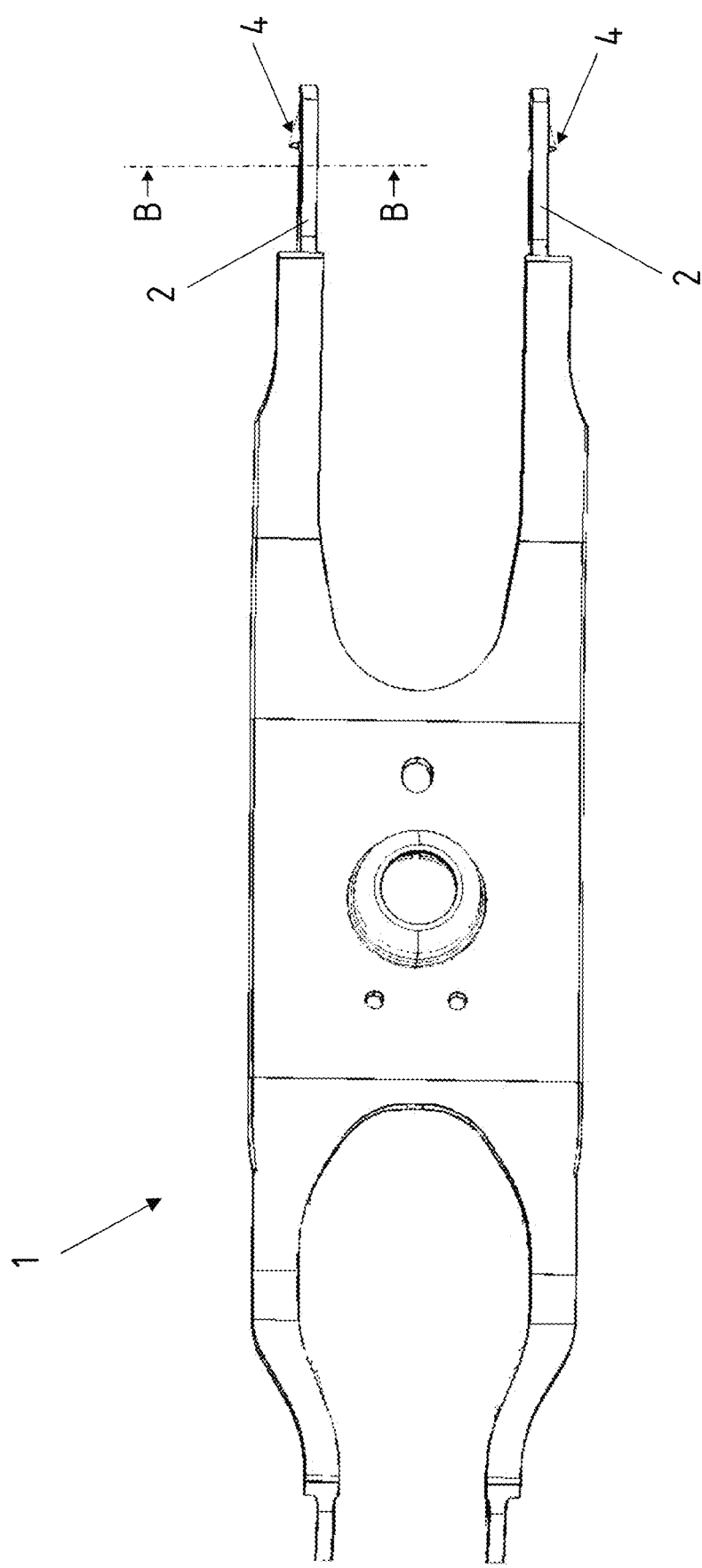
FIG. 2 shows a chassis component in a plan view according to at an embodiment of the disclosure.
Figure 3B:
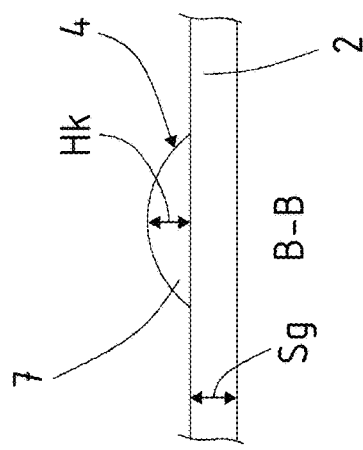
FIG. 3B shows a detailed view of a guide element according to section B-B of FIG. 2 according to at an embodiment of the disclosure.
Figure 3C:
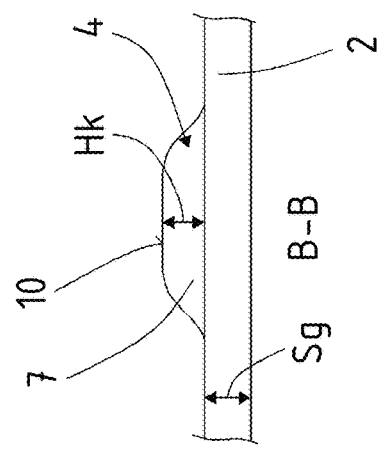
FIG. 3C shows an alternative embodiment variant of a guide element according to section B-B of FIG. 2 according to at an embodiment of the disclosure.
Figure 3A:
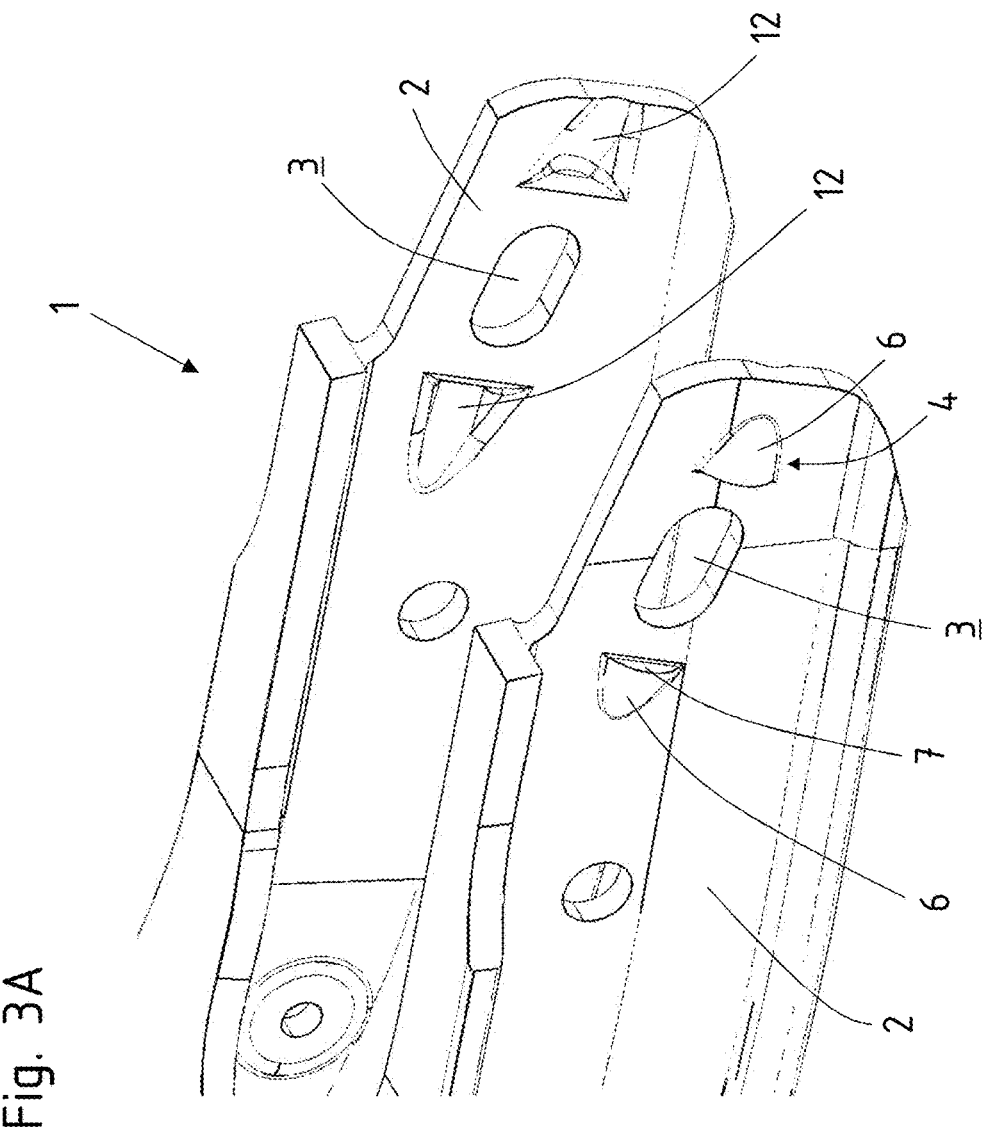
FIG. 3A shows a chassis component in a perspective view according to at an embodiment of the disclosure.

FIG. 1, FIG. 2, and FIG. 3A show a chassis component 1, which is a spring link. The chassis component has two opposing base bodies 2, which correspond to the link arms of the spring link. The base body 2 also has an opening 3 for passing through a fastening means. Two guide elements 4 for guiding an eccentric element 5 are arranged on the opposite sides of the opening 3, see FIG. 1B. The guide elements 4 are formed in one piece by mechanical processing and using the same material of the base body 2 of the chassis component 1. The guide elements 4 each have a back side 6 and a contact side 7 facing the opening 3. The contact side 7 is orthogonal to the base body 2. The opening 3 is designed in the form of an elongated hole.

The eccentric element 5 has an eccentric screw 8 with an outer collar 9. The outer collar 9 of the eccentric element 5 is guided by the guide elements 4 in such a way that when the eccentric element 5 rotates, the eccentric screw 8 moves within the opening 3 and the chassis component 1 is thus displaced.

According to the perspective view of the chassis component 1 in FIG. 3A the contact sides 7 have a plano-convex shape and the back sides 6 taper in the opposite direction to the contact sides 7 and merge into the base body 2. This design of the guide elements 4 ensures improved robustness of the guide elements 4, enables the guide elements 4 to be designed to be as space-saving as possible and is an optimal form for force transmission from the eccentric element 5 to the base body 2.

FIG. 3B shows the guide elements 4 and the base body 2 according to section B-B of FIG. 2. The plano-convex shaped contact sides 7 of the guide elements 4 have a height Hk which is less than or equal to the material thickness Sg of the base body 2. This ensures that the guide elements 4 always have sufficient material thickness.

FIG. 3C shows an alternative embodiment variant of the guide elements 4. The side of the contact side 4 facing away from the base body 2 has an at least partially flattened region 10, which extends parallel to the base body 2. In this way, the height Hk of the contact sides 7 and thus the height of the guide elements 4 can be designed as low as possible without reducing the contact surface for the eccentric element 5.

Figure 4:
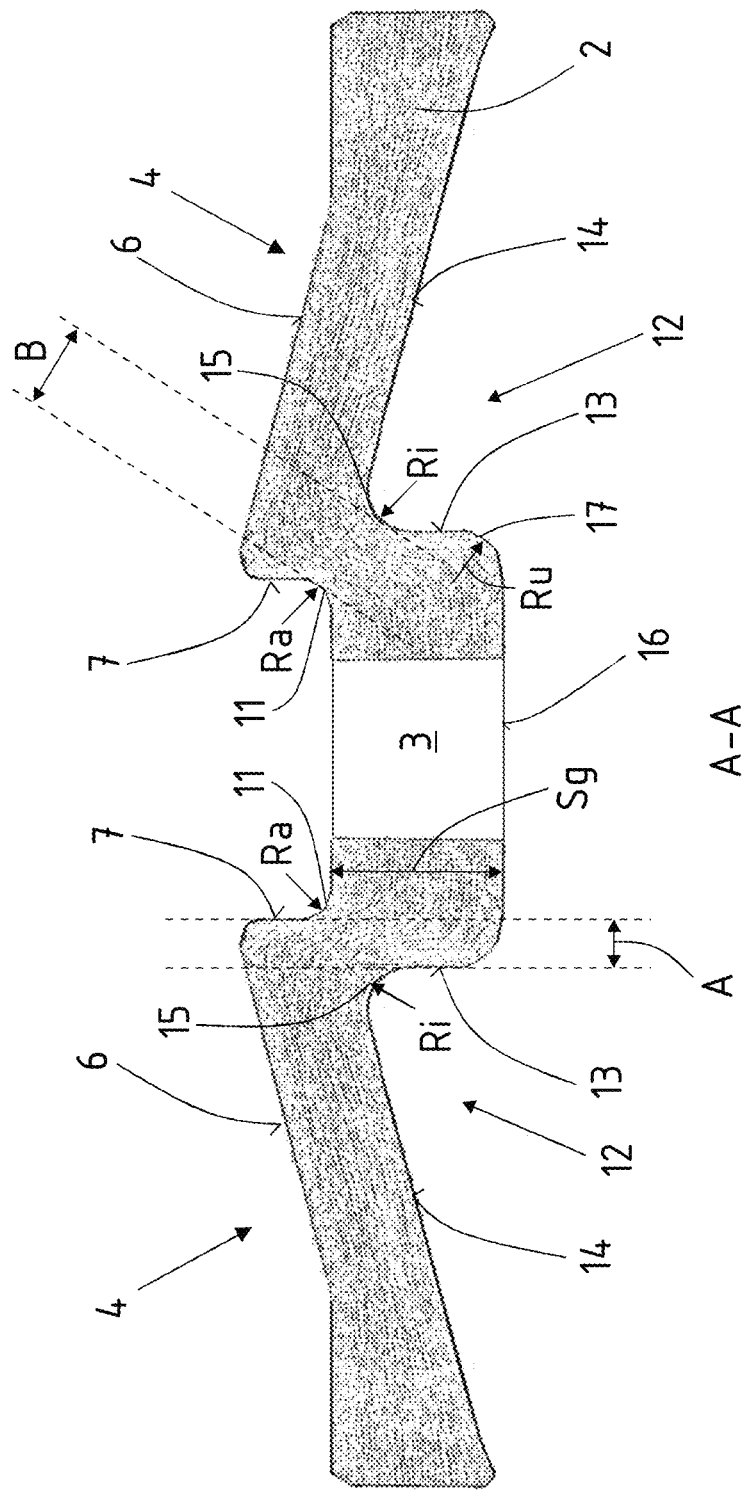
FIG. 4 shows a guide element according to section A-A of FIG. 1B according to at an embodiment of the disclosure.

The guide elements 4 in section A-A of FIG. 1B are shown in FIG. 4. According to the disclosure, an outer transition region 11 with a radius Ra is formed between the respective contact sides 7 and the base body 2. The transition region 11 increases the material thickness between the contact sides 7 and the base body 2. The radius Ra according to the disclosure, which connects the contact sides 7 with the base body 2, significantly reduces the risk of crack formation. This increases the service life of the chassis component 1.

The radius Ra is between 0.2 mm and 2 mm, between 0.5 mm and 1.5 mm.

The base body 2 has a respective indentation 12 below the guide elements 4, as seen in FIG. 3A and FIG. 4. The indentation 12 is created by mechanical forming of the guide elements 4. The indentations 12 have a front side 13 and a top side 14, wherein the front side 13 is arranged parallel to the contact side 7. In this case, a correspondingly parallel arrangement of the front sides 13 with the contact sides 7 leads to improved stability and robustness of the guide elements 4.

An orthogonal distance is formed between the parallel front side 13 and contact side 7, which corresponds to between 10% and 50% of the material thickness Sg of the base body 2. The distance A is between 20% and 40% and between 25% and 35% of the material thickness Sg of the base body 2. This distance A according to the disclosure ensures sufficient material thickness between the front side 13 and the contact side 7, which increases robustness and lifespan of the guide elements 4.

An inner transition region 15 with a radius Ri is able to be arranged between the front side 13 and the top side 14. The inner transition region 15 increases the stability of the guide elements 4 and also reduces the risk of cracks at the transition between the front side 13 and the top side 14.

The middle vertical cross section of the guide elements 4, as shown in section A-A of FIG. 4, comprises a distance B between the outer transition region 11 and the inner transition region 15. The distance B is in between 30% and 70% of the material thickness Sg of the base body 2. The distance B is between 40% and 60% and between 45% and 55% of the material thickness Sg of the base body 2. The distance B is therefore the smallest distance between the outer transition region 11 and the inner transition region 15. A length of the distance B according to the disclosure ensures sufficient material thickness, which increases the robustness and the service life of the guide elements 4. No shear cutting is required, reducing the risk of cracking. In addition, the distance B according to the disclosure is able to ensure that the fibers within the material structure are not damaged and the material strength is therefore fully maintained. The uninterrupted flow of the fibers of the material is able to be seen in FIG. 4.

The base body 2 has an underside 16 in the region of the opening 3. A lower transition region 17 with a radius is able to be formed between the front side 13 and the underside 16.

In an alternative embodiment variant, the chassis component 1 is able to be designed such that the inner transition region 15 merges directly into the lower transition region 17. In this case, no separate front side 13 is formed between the transition regions 15, 17.

The chassis component 1 is made of an aluminum alloy and is an extruded profile.

The guide elements 4 are cold formed. This enables short processing times, good surface quality, tight dimensional tolerances, optimal material utilization and long-term consolidation of the material. The grain flow of the material is also not interrupted.

As shown in FIG. 1 and FIG. 3, the opening is designed as an elongated hole. The elongated hole enables a corresponding movement of the chassis component 1 through the eccentric element 5.

Figure 5A:
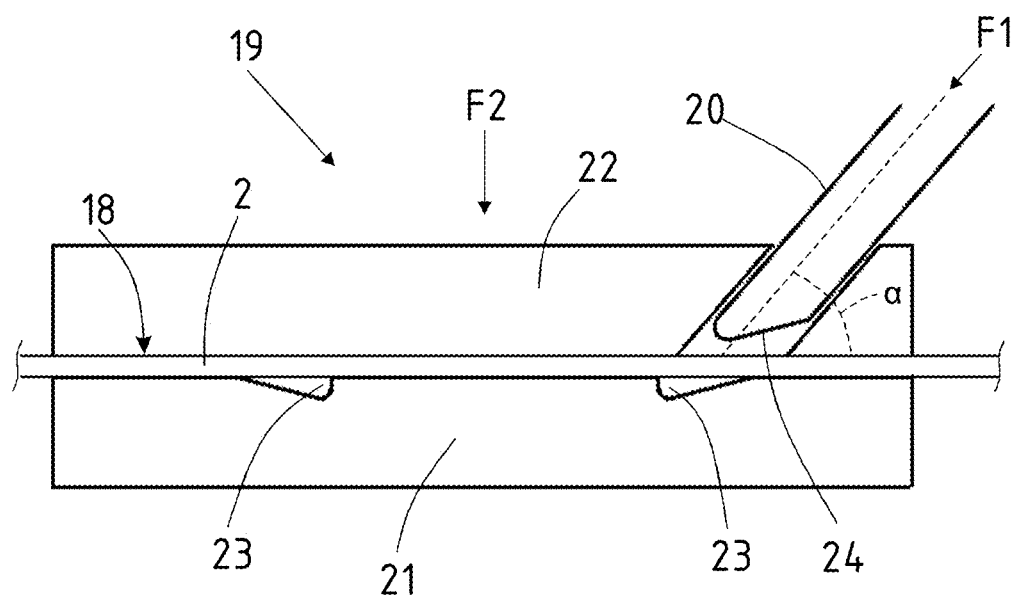
FIG. 5A shows a manufacturing method for producing a chassis component in the starting position according to at an embodiment of the disclosure.
Figure 5B:
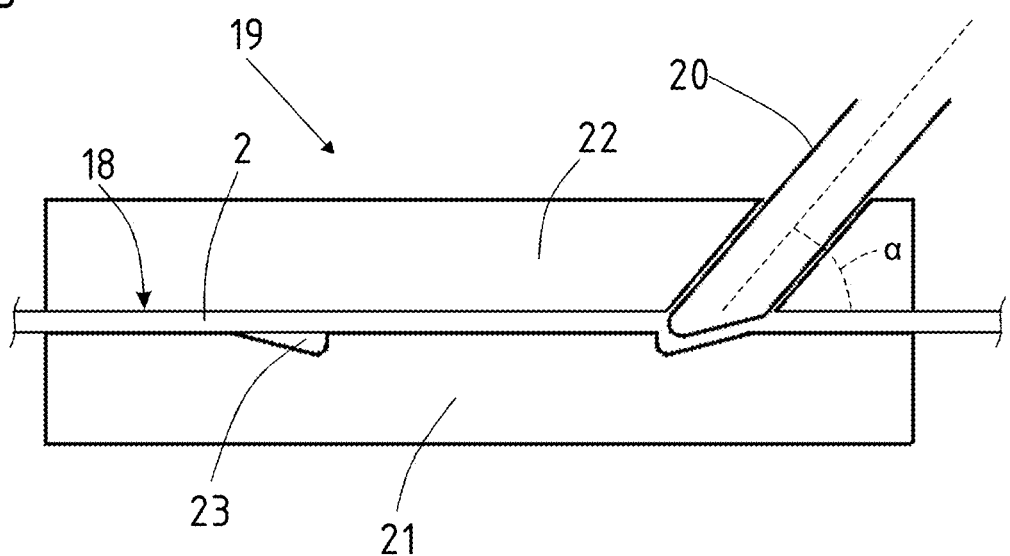
FIG. 5B shows a manufacturing method for producing a chassis component with punch feed according to at an embodiment of the disclosure.

FIG. 5A and FIG. 5B illustrate the method for producing a chassis component 1 according to the disclosure, wherein the method comprises the following steps:

initially a chassis component precursor 18 is provided, which is a spring link precursor. This chassis component precursor has a base body 2, which corresponds to the link arm of the spring link precursor.

the base body 2 of the chassis component precursor 18 is then inserted into a forming tool 19 in order to form the guide elements 4. The forming tool 19 has a punch 20, a lower die 21 and a fixing element 22, wherein the lower die 21 has mold recesses 23 corresponding to the guide elements 4 to be formed. The base body 2 is pressed onto the lower die 21 with a force F2 by the fixing element 22 and the shape of the guide elements 4 to be formed is determined based on the shape of the mold recesses 23 and the shape of the punch head 24.

the guide elements 4 are formed by a linear forward feed of the punch 20 with a force F1, wherein the punch 20 is aligned at an angle $\alpha$ between 30° and 60° relative to the base body 2. After the forming process, the finished chassis component 1 is obtained.

Due to the angle $\alpha$ according to the disclosure between the punch 20 and the base body 2, only a small amount of pressure is required to form the guide elements 4. The pressure for the forming process is between 5 t and 20 t, between 7.5 t and 13 t. In comparison to similar forming processes for producing guide elements 4, this involves extremely low pressure. On the one hand, this has the advantage that less energy is required for the forming process, and on the other hand, due to the low contact pressure, there are no unwanted indentations or other damage to the base body 2 that originate from the forming tool 19. The oblique orientation of the punch 20 also makes possible to obtain with the forming process a material structure that is optimal for the stability of the guide elements 4. The material fibers are preserved so that the material structure and thus the robustness and strength of the material are not affected.

The punch 20 has a punch head 24. The punch head is designed in such a way that, as a result of the forming process, the contact sides 7 of the guide elements 4 have a plano-convex shape and the back sides 6 taper in the opposite direction to the contact sides 7 and merge into the base body 2. The mold recesses 23 of the lower die 21 are also designed accordingly.

In at least one embodiment of the present disclosure, the punch head 24 is designed in such a way that by the forming process an inner transition region 15 with a radius Ri is formed between the front side 13 and the top side 14. The mold recesses 23 of the lower die 21 are designed in such a way that by the forming process an outer transition region 11 with a radius Ra is formed between the contact side 7 and the base body 2.

In at least one embodiment of the present disclosure, the base body 2 has an opening 3 for passing through a fastening means, so that the guide elements 4 are able to be formed on opposite sides of the opening 3 for guiding an eccentric element 5.

Alternatively, an opening 3 for passing through a fastening means is able to be formed in the base body 2 at the same time as the guide elements 4. Here too, the guide elements 4 are arranged on opposite sides of the opening 3. By simultaneously forming the opening 3 and guide elements 4, two processing steps of the production process are able to be merged, which has an advantageous effect on the processing time of the chassis component precursor 18.

The guide elements 4 are formed using a cold forming process. This enables short processing times, good surface quality, tight dimensional tolerances, optimal material utilization and long-term consolidation of the material. The grain flow of the material is also not interrupted.

In at least one embodiment of the present disclosure, the surfaces of the guide elements 4 are additionally polished after the forming process. This further increases the service life of the chassis component 1.

The invention claimed is:

1. A method of producing a chassis component, the method comprising:
    inserting a base body of the chassis component into a forming tool to form guide elements, wherein the forming tool comprises a punch, a lower die, and a fixing element, and the lower die comprises mold recesses corresponding to the guide elements, and forming the guide elements by linearly advancing the punch, and the punch is aligned at an angle $\alpha$ between 30° and 60° relative to the base body, in order to obtain the chassis component, wherein the forming takes place at a pressure between 5 t and 20 t, or 7.5 t and 13 t.

2. The method according to claim 1, wherein the base body comprises an opening configured to receive a fastening means and the guide elements are on opposite sides of the opening for guiding an eccentric element.

3. The method according to claim 1, wherein an opening configured to receive a fastening means is formed in the base body at a same time as the guide elements, and the guide elements are on opposite sides of the opening.

4. The method according to claim 1, wherein the guide elements are cold formed.

5. The method according to claim 1, wherein the forming takes place at the pressure between 7.5 t and 13 t.

* * * * *